Oct. 31, 1967   W. J. KUDLATY   3,349,914
AUTOMATIC FILTER ASSEMBLY
Filed March 4, 1965   2 Sheets-Sheet 2
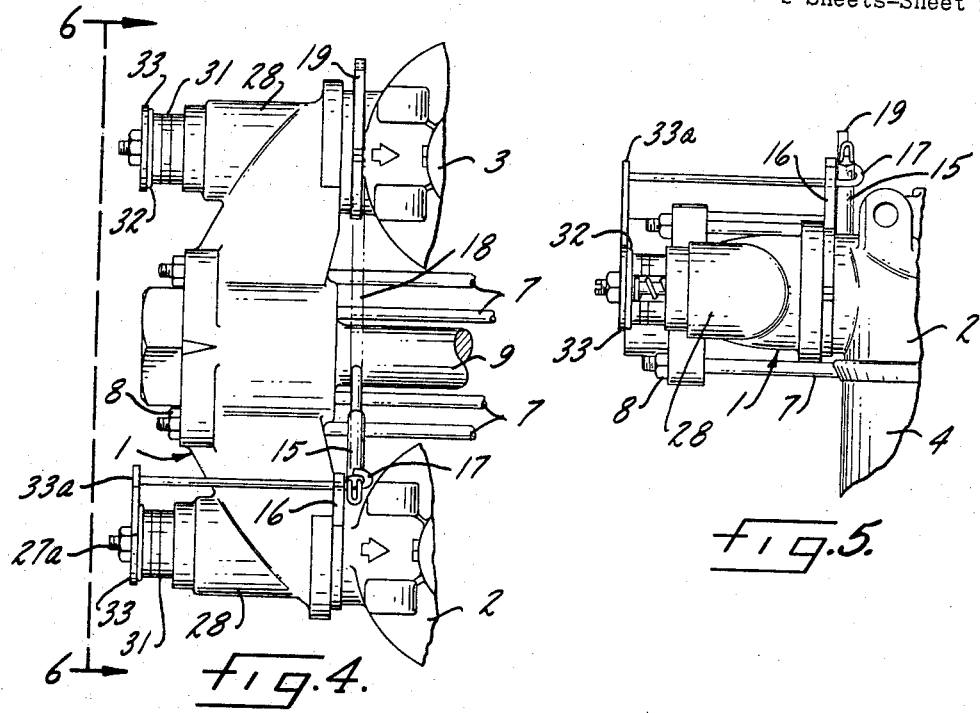
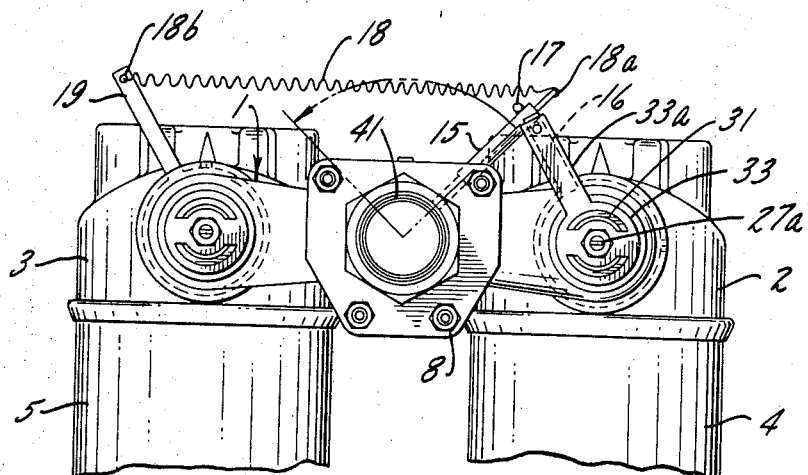
INVENTOR.
Walter J. Kudlaty,
BY Parker & Carter
ATTORNEYS.

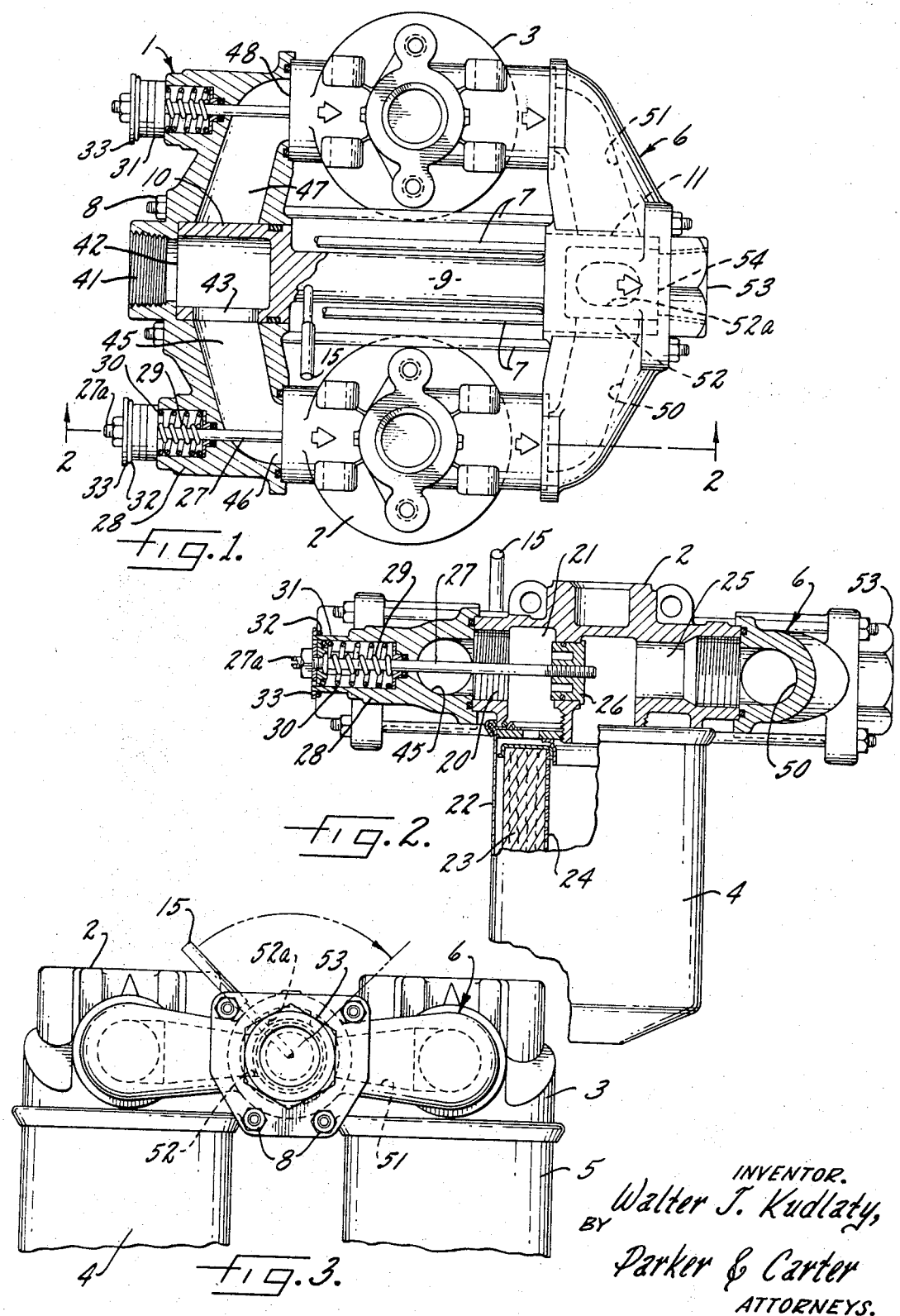

United States Patent Office 3,349,914
Patented Oct. 31, 1967

3,349,914
AUTOMATIC FILTER ASSEMBLY
Walter J. Kudlaty, Elmhurst, Ill., assignor to Marvel Engineering Company, Chicago, Ill., a corporation of Illinois
Filed Mar. 4, 1965, Ser. No. 437,092
6 Claims. (Cl. 210—90)

This invention relates to filtering processes and has particular relation to an automatic filter assembly.

One purpose of the invention is to provide an assembly insertable in a system having fluid required to be filtered.

Another purpose is to provide a filter assembly and a means automatically effective to redirect the flow of fluid in response to clogging of a filter in said assembly.

Another purpose is to provide an automatic filter assembly including at least two filter elements and means for directing a flow of fluid alternately therebetween.

Another purpose is to provide an automatic filter assembly including at least two filter elements and an inlet and outlet manifold communicating therewith.

Another purpose is to provide a filter assembly including inlet and outlet manifolds and at least two filter head structures therebetween.

Another purpose is to provide an automatic filter assembly including inlet and outlet manifolds, at least two filter heads therebetween and communicating therewith and by-pass valves in said filter heads.

Another purpose is to provide an automatic filter assembly including inlet and outlet manifolds, at least a pair of filter heads therebetween, by-pass valves associated with each of said filter heads and means operatively connecting at least one of said by-pass valves with a director valve in said inlet manifold.

Another purpose is to provide means automatically effective to insure continued filtering of fluid to be filtered in the presence of a clogged filter.

Another purpose is to provide a dual filter assembly.

Other purposes will appear from time to time during the course of the specification and claims.

The invention is illustrated more or less diagrammatically in the accompanying drawings wherein:

FIGURE 1 is a top plan view with parts in cross section;

FIGURE 2 is a side view with parts in cross section and parts broken away;

FIGURE 3 is an end view;

FIGURE 4 is a partial top plan view of a form of the invention;

FIGURE 5 is a side view of the structure of FIGURE 4; and

FIGURE 6 is an end view taken at the line 6—6 of FIGURE 4.

Like parts are indicated by like numerals throughout the specification and drawings.

Referring now to the drawings, and particularly to FIGURE 1, the numeral 1 generally refers to an inlet manifold. A pair of filter head structures are indicated at 2, 3. Filter housings 4 and 5 are secured to and depend from, as the parts are shown in the drawings, the heads 2, 3, respectively.

Referring now to FIGURE 2, it will be observed that an outlet manifold 6 is secured to the heads 2, 3. A plurality of elongated tension members or bolts 7 extend through the manifolds 1, 6 and across the space therebetween and between heads 2, 3 to secure, by means of the nuts 8 for example, the elements 1, 2, 3 and 6 together. A fluid directing or diverting valve 9 has a valve conformation 10 at one of its ends and rotatable within manifold 1 and a similar valve conformation 11 at its opposite end and rotatable in manifold 6.

A director valve-operating lever 15 is secured to the member 9 and extends angularly, upwardly from the member 9 between the manifolds 1, 6.

In the form shown in FIGURES 4, 5 and 6 a bracket 16 slidably supports a retaining hook member 17 normally in engagement with the lever 15. A spring 18 has one of its ends secured to lever 15 as at 18a and has its opposite end retained by a bracket 19 carried by manifold 1 as indicated at 18b.

As may be best seen perhaps in FIGURES 1 and 2, the head 2 has an inlet 20 communicating with the manifold 1 and a chamber 21 within the head 2. The chamber 21 communicates with the area 22 within the filter housing 4 in which a filter element 23 is positioned. The core area 24 within filter element 23 in turn communicates with a filter head outlet 25, the outlet 25 communicating with outlet manifold 6.

A by-pass valve member 26 is carried within filter head 2 to preclude direct communication between chamber 21 therein and outlet 25. A valve rod 27 is secured to valve member 26 and extends through inlet 20 of head 2 as well as through manifold 1 to a point externally thereof. The manifold 1 includes a pocket-forming extension 28 through which rod 27 extends and in which springs 29, 30 are positioned. The external surface of extension 28 includes a circumferential surface 31 along which an indicator ring 32 is slidable. In FIGURES 4, 5 and 6 hook member 17 extends parallel with rod 27 and is secured to an extension 33a of a finger member 33 which is shown without such extension in FIGURES 1, 2 and 3. Member 33, in either case, is secured to external end 27a of rod 27 and finger member 33 engages ring 32 and is slidable along the surface 31 in response to movement of valve 26 and rod 27 toward outlet 25, as the parts are shown in the drawings.

It will be understood that the elements, 20, 21, 22, 23, 24, 25, 27, 28, 29, 30, 31, 32 and 33 are repeated with respect to filter head 3. With respect to filter head 3, however, the finger member 33 is, of course, without an extension 33a.

It will be observed that the manifold 1 has a generally centrally positioned inlet 41. The spool valve 10 has a permanently open end 42 continuously communicating with the inlet 41 and an outlet opening 43 continuously communicating with open end 42. As may be seen in dotted lines in FIGURE 3, the valve portion 10 has a second opening (not shown) circumferentially spaced on the member 10 from opening 43. A branch passage 45 communicates with the central area of manifold 1 in which valve 10 is positioned and has an outlet 46 arranged for communication with inlet 20 of head 2. A second branch passage 47 is formed in manifold 1 and communicates with the central area in which valve 10 is positioned, the passage 47 having an outlet portion 48 for communication with an inlet in head 3 corresponding to inlet 20. As may be seen in FIGURE 1, the outlet 43 is shown as communicating with passage 45, thus communicating inlet 41 of manifold 1 with the head 2. With the opening 43 in said position, the second opening (not shown) is closed against the upper surface of manifold 1.

Similarly, manifold 6, as shown in dotted lines in FIGURE 1, has a branch passage 50 communicating with outlet 25 of head 2 and with the central area of manifold 6 in which spool valve 11 is positioned. A second branch passage 51 communicates with an outlet of head 3 similar to outlet 25 and with said central area of manifold 6. It will be understood that the valve 11 is substantially identical with valve 10, having an inlet opening 52 and a second opening 52a which is closed against the upper surface of manifold 6 when outlet 52 is in position communicating with passage 50, as shown. The manifold 6 has an outlet 53 communicating with permanently open end 54 of valve 11 which is in turn in perpetual communication with the inlet openings 52 and 52a.

Whereas there has been shown and described on operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

The inlet 41 is connected to the conduit or line through which flows the fluid to be filtered. The outlet 53 is connected to a continuing or downstream portion of said line. As illustrated, the opening 43 of spool or director valve 10 is positioned for communication with passage 45 in manifold 1. Hence fluid entering the inlet 41 is directed by valve 10 into passage 45 and by passage 45 into inlet 20 of head 2. Thereafter the fluid flows into chambers 21 and 22, through the filter media 23, core 24 and outlet 25 into passage 50 of outlet manifold 6. The valves 10, 11 move together and inlet opening 52 of valve 11 is thus positioned in communication with passage 50. The filtered fluid thereby flows through opening 52 from passage 50 outwardly through opening 54 in valve 11 and through the outlet 53 of manifold 6.

Should the filter media 23 become clogged beyond a predetermined satisfactory level, valve 26 will open, i.e. valve 26 will move to the right as the parts are shown, for example, in FIGURES 1 and 2.

Movement of valve 26 in the form of FIGURES 1, 2 and 3 produces movement of indicator ring 32 through rod 27 and finger 33. With this indication of clogging, the operator rotates lever 15 to direct fluid through head 3 and filter housing 5 while filter element 23 is being cleaned or replaced. In the form of FIGURES 4, 5 and 6, such movement of valve 26 causes corresponding movement of rod 27, finger 33, extension 33a and hook 17 to disengage hook 17 from director valve control lever 15. Upon release of hook 17 from lever 15, spring 18 is effective to draw the lever 15 across manifold 1 and thus to move the second opening (not shown) in valve 10 into communication with passage 47 of manifold 1, the opening 43 being closed against the upper surface of manifold 1 thereby. With said second opening in communication with passage 47 and the corresponding opening 52a in valve 11 in communication with passage 51, it will be understood that fluid entering inlet 41 is thereafter directed through passage 47 of manifold 1 into head 3 from whence it flows through a filter element in housing 5 corresponding to element 23, 24 and through an outlet in head 3 corresponding to outlet 25. Thereafter said filtered fluid flows through passage 51 and valve 11 for discharge through outlet 53 of manifold 6.

It will be understood that the action of redirecting the flow of fluid from head 2 and the filter element associated therewith to head 3 and its associated filter element is thus automatic in response to clogging of said first-named filter element in the form of FIGURES 4, 5 and 6. In the normal course of events, maintenance personnel or others responsible therefor, upon observing the fact that the lever 15 has been moved to its second position and that the fluid has thus been redirected, will clean or replace the filter media 23, the housing 4 being separable for that purpose. With a clean filter media 23 thereafter in the housing 4, the operator will reset the structure of the invention, manually rotating lever 15 into the position shown in the drawings while pressing inwardly on rod end 27a to move hook 17 out of the way of lever 15. Thereafter the operator permits springs 29, 30 to return hook 17 into the position shown in the drawings and to engage hook 17 with lever 15 to hold the same in the position shown against the action of spring 18.

Should a substantial period of time transpire after the automatic redirection of fuel into head 3 before the operator cleans or replaces the filter element of head 2 and resets the structure of the invention, it is possible that the filter element associated with head 3 could become contaminated. Hence the by-pass valve structure associated with head 3 is provided to insure a flow of fluid from inlet 41 through outlet 53 to preclude starvation of machinery requiring the fluid. Should said by-pass valve of head 3 thus open, the ring 32 associated with the surface 31 aligned with head 3 will be moved along said surface by the member 33 in response to movement of the by-pass rod extending from head 3 through manifold 1. The operator, by observing the position of ring 32, will realize that the valve has opened. It will be observed that the surface 31 may be provided with suitable indicia, such as vari-colored areas to indicate the extent to which the by-pass valve has opened. It will be realized also that the rods secured to the by-pass valves of the invention could be arranged to actuate suitable signaling or shutoff devices as desired without departing from the nature and scope of the invention.

Thus is provided a dual filter assembly and an assembly having a normal filtering structure and an alternate filtering structure with means automatically effective to redirect fluid from the normal to the alternate filter structure in immediate response to predetermined clogging of said normal filter and to insure a continuing, unbroken supply of filtered fluid to the location requiring it.

What is claimed:

1. A filter assembly including an inlet manifold, an outlet manifold, a plurality of filter structures between said manifolds, tie rods extending between said manifolds to clamp said structures therebetween and a director valve positioned in each of said manifolds to direct fluid through one of said structures, a by-pass valve in one of said structures and a releasable retaining connection between said by-pass valve and said director valve, said director valve being held by said by-pass valve in a first position to communicate said inlet and outlet manifolds with said one of said structures, and yielding means connected to said director valve and urging said director valve towards a second position to communicate said inlet and outlet manifolds with another of said structures.

2. An automatic multiple filter assembly including a plurality of filter structures, an inlet manifold having a fluid inlet and communicating with each of said structures, an outlet manifold having a fluid outlet and communicating with each of said structures, a by-pass valve positioned in one of said structures normally to pass fluid directly through said one structure from said inlet manifold to said outlet manifold in response to clogging within said one structure, director valves in said manifolds, a retaining connection between said by-pass valve and said director valves effective to retain to retain said director valves in a first position to direct fluid through said one structure, said director valves being yieldingly urged toward a second position to direct fluid to another of said structures, said retaining connection being opened in response to opening of said by-pass valve.

3. A filter assembly including an inlet maniford, an outlet manifold, a plurality of filter structures between said manifolds, and a director valve positioned in said manifolds to direct fluid through one of said strsctures, a by-pass valve in one of said structures and a releasable retaining connection between said by-pass valve and said director valve, and a by-pass valve in each of the remaining structures each said by-pass valve being effective automatically to open direct communication through its associated structure between said manifolds in response to clogging in its associated structure, indicator means on said inlet manifold and an operating connection between said by-pass valves and said indicator means.

4. A dual filter assembly including an inlet manifold, a fluid inlet in said manifold, a pair of filter heads communicating with said manifold, an outlet manifold communicating with said heads, means clamping said heads between said manifolds, a fluid outlet in said outlet manifold, a filter element connected to each of said heads, a by-pass valve seated in each of said heads to open communication through said heads directly between said manifolds in response to clogging of said filters and director valves positioned in said manifolds to direct fluid entering said inlet manifold to one of said heads and to direct fluid leaving said one head to said fluid outlet while precluding communication between said manifolds and the other of said heads, said director valve being yieldingly urged toward a first position directing fluid through said one head, and a releasable connection between said director valves and the by-pass valve in the other of said heads, said connection retaining said director valves in a second position directing fluid through said other head.

5. A dual filter assembly including an inlet manifold, a fluid inlet in said manifold, a pair of filter heads communicating with said manifold, an outlet manifold communicating with said heads, a fluid outlet in said outlet manifold, a filter element connected to each of said heads, a by-pass valve seated in each of said heads to open communication through said heads directly between said manifolds in response to clogging of said filters and director valves positioned in said manifolds to direct fluid entering said inlet manifold to one of said heads and to direct fluid leaving said one head to said fluid outlet, yielding means urging said director valves toward a position communicating said manifolds with one of said heads, catch means operatively connected to the by-pass valve in the other of said heads and engaging said director valves to hold the same against the action of said yielding means, said catch means disengaging said director valves in response to opening of said by-pass valve in said other head.

6. A dual filter assembly comprising an inlet manifold, an outlet manifold, a pair of filter heads communicating said manifolds, director valves movable in said manifolds to direct a flow of fluid through one of said heads and preclude flow of fluid through the other of said heads, a by-pass valve in each of said heads, a filter element associated with each of said heads, said by-pass valves being openable automatically in response to predetermined clogging of their associated filter element, means yieldingly urging said director valves toward one position, catch means normally holding said director valves in another position and an operating connection between said catch means and one of said by-pass valves whereby said catch means is opened in response to opening of said one by-pass valve.

References Cited

UNITED STATES PATENTS

| | | | |
|---|---|---|---|
| 1,042,203 | 10/1912 | Dahl et al. | 210—424 X |
| 1,759,927 | 5/1930 | Zwicky | 210—340 X |
| 1,800,517 | 4/1931 | Foster | 210—340 X |
| 1,861,805 | 6/1932 | Lentz | 210—340 X |
| 2,423,329 | 7/1947 | LeClair | 210—134 X |
| 2,473,032 | 6/1949 | LeClair | 210—340 |
| 2,679,320 | 5/1954 | Walton | 210—340 X |
| 2,693,281 | 11/1954 | Winzen | 210—423 |
| 2,998,138 | 8/1961 | Mould et al. | 210—90 |
| 3,080,972 | 3/1963 | Smith | 210—90 |

REUBEN FRIEDMAN, *Primary Examiner.*

J. ADEE, *Assistant Examiner.*